US008594724B2

(12) United States Patent
Zhou et al.

(10) Patent No.: US 8,594,724 B2
(45) Date of Patent: Nov. 26, 2013

(54) MULTI-MODE CONVERGENCE METHOD, MULTI-MODE COMBINATION METHOD, AND DEVICES THEREOF

(75) Inventors: Taoyuan Zhou, Shenzhen (CN); Jiangchun Gu, Shenzhen (CN); Aihua Hu, Shenzhen (CN); Yong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 636 days.

(21) Appl. No.: 12/784,990

(22) Filed: May 21, 2010

(65) Prior Publication Data

US 2010/0296469 A1 Nov. 25, 2010

(30) Foreign Application Priority Data

May 21, 2009 (CN) .......................... 2009 1 0139393

(51) Int. Cl.
*H04M 1/00* (2006.01)
(52) U.S. Cl.
USPC ......... 455/552.1; 455/137; 455/3.01; 455/14; 370/342; 370/349; 370/401
(58) Field of Classification Search
USPC ........ 455/500, 552.1, 137, 3.01, 14; 370/238, 370/342, 503, 401, 349; 375/259
See application file for complete search history.

(56) References Cited

U.S. PATENT DOCUMENTS

| 7,940,667 B1* | 5/2011 | Coady et al. | 370/238 |
| 8,018,910 B2* | 9/2011 | Jiang et al. | 370/342 |
| 8,050,296 B2* | 11/2011 | Osterling | 370/503 |
| 2005/0007993 A1* | 1/2005 | Chambers et al. | 370/349 |
| 2008/0205366 A1 | 8/2008 | Wang et al. | |
| 2010/0296469 A1 | 11/2010 | Zhou et al. | |
| 2011/0158332 A1* | 6/2011 | Wu et al. | 375/259 |
| 2011/0287791 A1* | 11/2011 | Fujishima et al. | 455/500 |

FOREIGN PATENT DOCUMENTS

| CN | 1901705 A | 1/2007 |
| CN | 101375575 A | 2/2009 |
| CN | 101557597 A | 10/2009 |
| WO | WO 2006/026450 A1 | 3/2006 |
| WO | WO 2007/069191 A2 | 6/2007 |

OTHER PUBLICATIONS

First Chinese Office Action with Partial Translation, Application No. 200910139393.3, mailed May 12, 2010, 7 pages.

\* cited by examiner

*Primary Examiner* — Junpeng Chen
(74) *Attorney, Agent, or Firm* — Slater & Matsil, L.L.P.

(57) ABSTRACT

A multi-mode convergence method, a multi-mode combination method, and devices thereof are provided. The multi-mode convergence method includes the following steps. Data from multi-mode base band units (BBUs) is received and separated into downlink service data and operation maintenance data. A channel configuration is generated according to the operation maintenance data. The downlink service data of a corresponding mode is selected according to the channel configuration, and the downlink service data and the operation maintenance data are consolidated, and the consolidated data is sent to corresponding remote radio unit (RRUs). The multi-mode convergence method, the multi-mode combination method, and devices thereof are adopted, so as to accomplish functions, such as multi-mode and pseudo noise (PN) multiplexing, to decrease complexity of a multi-mode system, and provide a function of multi-mode coexistent optical fiber.

8 Claims, 8 Drawing Sheets

MULTI-MODE CONVERGENCE METHOD, MULTI-MODE COMBINATION METHOD, AND DEVICES THEREOF

This application claims priority to Chinese Patent Application No. 200910139393.3, filed on May 21, 2009, which is hereby incorporated by reference in its entirety.

TECHNICAL FIELD

The present invention relates to the field of wireless communication, and more particularly to a multi-mode convergence method, a multi-mode combination method, and devices thereof.

BACKGROUND

In the field of wireless communication, currently a plurality of systems exists, such as a global system for mobile communications (GSM), a code division multiple access (CDMA) system, a universal mobile telecommunication (UMTS) system, a long term evolution (LTE) system, and a worldwide interoperability for microwave access (WiMAX) system. With the development of the communication technology, demands for co-existence and smooth evolvement of a plurality of systems appear. In an existing multi-mode coexistent communication system, a plurality of systems is completely independent or one system thereof accomplishes convergence and combination functions.

In the prior art, a solution that a plurality of systems is completely independent is as shown in FIG. 1 (taking a system that CDMA and LTE are coexistent as an example), a base band unit (BBU) and a remote radio unit (RRU) of each system are completely independent. The multi-mode coexistence only includes a multi-mode common station address and practically base stations are completely independent. The solution has the following disadvantages. During multi-mode independent configuration, optical fiber transmission from a base station to a remote RRU can not be shared, and a remote radio frequency module can not be shared at the same frequency band.

In the prior art, a solution of transparent transmission through one system when a plurality of systems coexists is as shown in FIG. 2. In an example that CDMA and LTE coexist, quadrature base band service data (in-phase and quadrature-phase, IQ) of the CDMA and operation maintenance data of the CDMA RRU are firstly sent to a base band processing unit of the LTE (LTE BBU). The base band processing unit of the LTE is combined into the base band IQ data of the LTE and the operation maintenance data of the LTE RRU and sent to the RRUs of the LTE and CDMA through optical fibers or cables. The inventors find that the solution in the prior art has the disadvantages as follows after researching. The content of the plurality of systems is converged by using one system among the systems, so that the complexity of the convergence system is increased. The convergence manner and mode are closely coupled, so that flexibility of the multi-mode coexistence is decreased. The convergence manner and mode are closely coupled, which adversely affects smooth evolvement among the plurality of systems~

SUMMARY OF THE INVENTION

In order to solve the above problems in the prior art, in an embodiment, the present invention provides a multi-mode convergence method, which includes the following steps. Data from base band units (BBUs) of two or more modes is received and separated into downlink service data and operation maintenance data. A channel configuration is generated according to the operation maintenance data. Downlink service data of a mode is selected according to the channel configuration of the mode, the downlink service data and the operation maintenance data of the mode are consolidated, and the consolidated data is sent to remote radio units (RRUs) of the mode.

In an embodiment, the present invention further provides a multi-mode combination method, which includes the following steps. Data from RRUs of two or more modes are received and separated into uplink service data and operation maintenance data. A channel configuration is generated according to the operation maintenance data. Uplink service data of a mode is sent according to the channel configuration of the mode, the uplink service data and the operation maintenance data of the mode are consolidated, and the consolidated data is sent to BBUs of the mode.

In an embodiment, the present invention further provides a multi-mode convergence device, which includes a base band interface processing unit, an operation maintenance unit, a service data selection/consolidation unit, and a radio frequency interface processing unit. The base band interface processing unit is configured to receive data from BBUs of two or more modes and separate the received data into downlink service data and operation maintenance data. The operation maintenance unit is configured to generate a channel configuration according to the operation maintenance data. The service data selection/consolidation unit is configured to select downlink service data of a mode according to the channel configuration of the mode. The radio frequency interface processing unit is configured to consolidate the selected downlink service data and the operation maintenance data of the mode, and send the consolidated data to RRUs of the mode.

In an embodiment, the present invention further provides a multi-mode combination device, which includes a radio frequency interface processing unit, an operation maintenance unit, a service data selection/consolidation unit, and a base band interface processing unit. The radio frequency interface processing unit is configured to receive data from RRUs of two or more modes and separate the received data into uplink service data and operation maintenance data. The operation maintenance unit is configured to generate a channel configuration according to the operation maintenance data. The service data selection/consolidation unit is configured to send uplink service data of a mode according to the channel configuration of the mode. The base band interface processing unit is configured to consolidate the uplink service data sent by the service data selection/consolidation unit and the operation maintenance data of the mode and send the consolidated data to BBUs of the mode.

In an embodiment, the present invention further provides a multi-mode convergence system, which includes two or more remote radio units (RRUs), two or more base band units (BBUs), and a multi-mode convergence device, the multi-mode convergence device comprises: a base band interface processing unit, configured to receive data from base band units (BBUs) of two or more modes, and separate the received data into downlink service data and operation maintenance data; an operation maintenance unit, configured to generate channel configuration according to the operation maintenance data; a service data selection/consolidation unit, configured to select downlink service data of a mode according to the channel configuration of the mode; and a radio frequency interface processing unit, configured to consolidate the selected downlink service data and the operation maintenance data of the mode, and send the consolidated data to remote radio unit (RRU) of the mode.

In an embodiment, the present invention further provides a multi-mode convergence system, which includes two or more remote radio units (RRUs), two or more base band units (BBUs), and a multi-mode combination device; wherein the multi-mode combination device comprises: a radio frequency interface processing unit, configured to receive data from remote radio units (RRUs) of two or more modes, and separate the received data into uplink service data and operation maintenance data, wherein the multi-mode means two or more modes; an operation maintenance unit, configured to generate channel configuration according to the operation maintenance data; a service data selection/consolidation unit, configured to send uplink service data of a mode according to the channel configuration of the mode; and a base band interface processing unit, configured to consolidate the uplink service data sent by the service data selection/consolidation unit and the operation maintenance data of the mode, and send the consolidated data to base band unit (BBU) of the mode.

Through the multi-mode convergence method, the multi-mode combination method, and the device thereof provided in the embodiments of present invention, a problem of smooth upgrade of a plurality of systems is solved, various systems are uncoupled when the plurality of systems coexists, various systems are independent from each other, complexity of each system is decreased, and cost is reduced.

BRIEF DESCRIPTION OF THE DRAWINGS

To illustrate the technical solution according to the embodiments of the present invention or in the prior art more clearly, the accompanying drawings for describing the embodiments or the prior art are given briefly below. Apparently, the accompanying drawings in the following description are only some embodiments of the present invention, and person having ordinary skill in the art can derive other drawings from the accompanying drawings without creative efforts.

DETAILED DESCRIPTION OF ILLUSTRATIVE EMBODIMENTS

The following detailed description is directed to the technical solution of the present invention with reference to the accompanying drawings. However, the embodiments to be described are only part of, rather than all of, the embodiments of the present invention. Person having ordinary skill in the art can derive other embodiments from the embodiments given herein without making any creative effort, and all such embodiments are covered in the protection scope of the present invention.

In the embodiments, the present invention provides a multi-mode convergence method, a multi-mode combination method, and devices thereof. Generally speaking, the convergence means that multi-mode base band data and operation maintenance data are converged to a convergence/combination device in a direction from base band units (BBUs) to remote radio units (RRUs), and the combination means that uplink base band data of the same mode is combined by the convergence/combination device in a direction from the RRUs to the BBUs, and the combined data is sent to each BBU.

The "multi-mode" or "plurality of" in the embodiments of the present invention usually means the number of two or more.

The operation maintenance data in the embodiments of the present invention usually means information such as control, a status, and configuration of the device. The service data usually includes data of a mobile phone or other terminals (which includes voice and data).

Figure 1:
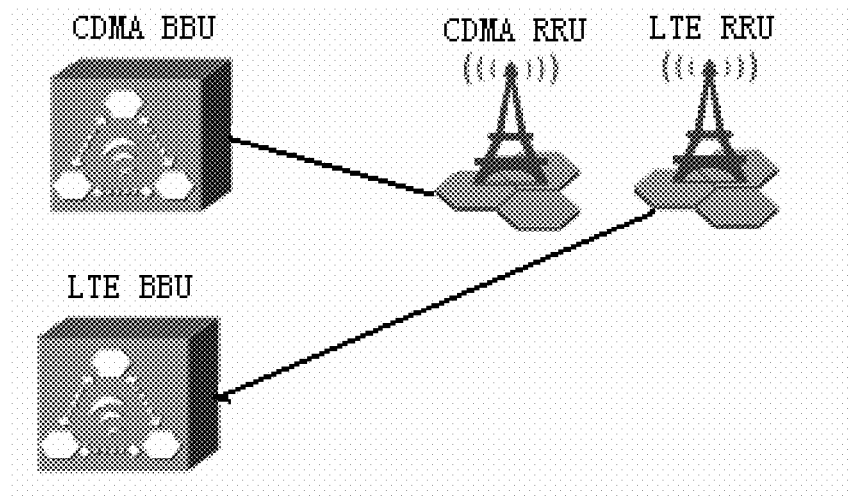
FIG. 1 is a diagram of a solution that various systems are completely independent in the prior art.
Figure 2:
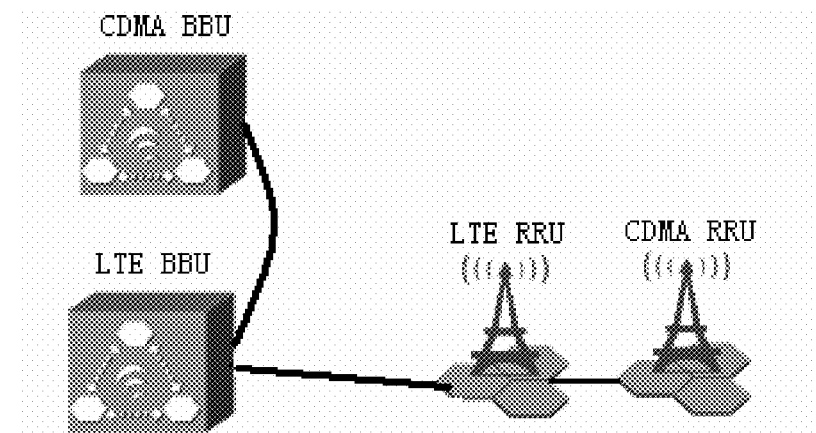
FIG. 2 is a diagram of a solution of system transparent transmission when various systems coexist in the prior art.
Figure 3:
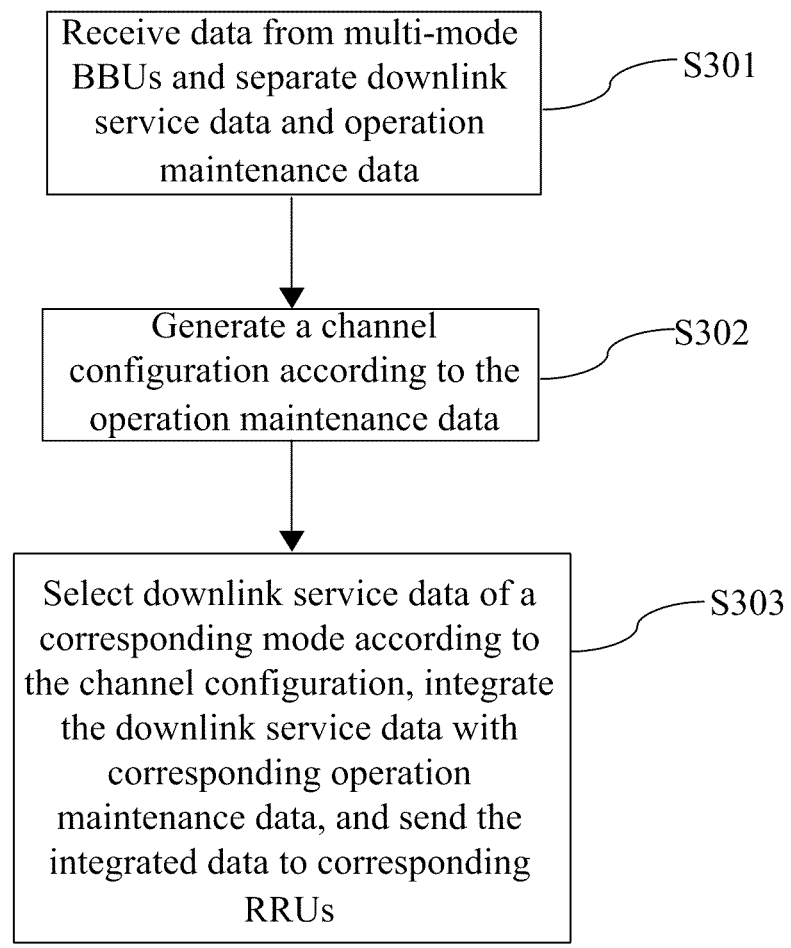
FIG. 3 is a flow chart of a multi-mode convergence method according to a first embodiment of the present invention.

In a first embodiment, the present invention provides a multi-mode convergence method. As shown in FIG. 3, the multi-mode convergence method includes the following steps.

In Step S301, data from BBUs of two or more modes is received and separated into downlink service data and operation maintenance data.

In Step S302, a channel configuration is generated according to the operation maintenance data.

In Step S303, downlink service data of a mode is selected according to the channel configuration of the mode, the downlink service data and the operation maintenance data of the mode are consolidated, and the consolidated data is sent to RRU of the mode.

The multi-mode convergence method provided in the embodiment of the present invention is configured to accomplish a multi-mode function, so as to decrease complexity of a multi-mode system, solve a problem of smooth upgrade of a plurality of systems, uncouple various systems when a plurality of systems coexists, so that various systems are independent from each other, complexity of each system is decreased, and cost is decreased.

In the following a base station that conforms to a common public radio interface (CPRI) standard is taken as an example to illustrate specific implementation of the present invention. However, persons skilled in the art can understand that other open interface standards such as the open base station architecture initiative (OBSAI) standard and the CPRI standard are also applicable in the embodiments of the present invention.

Figure 4:
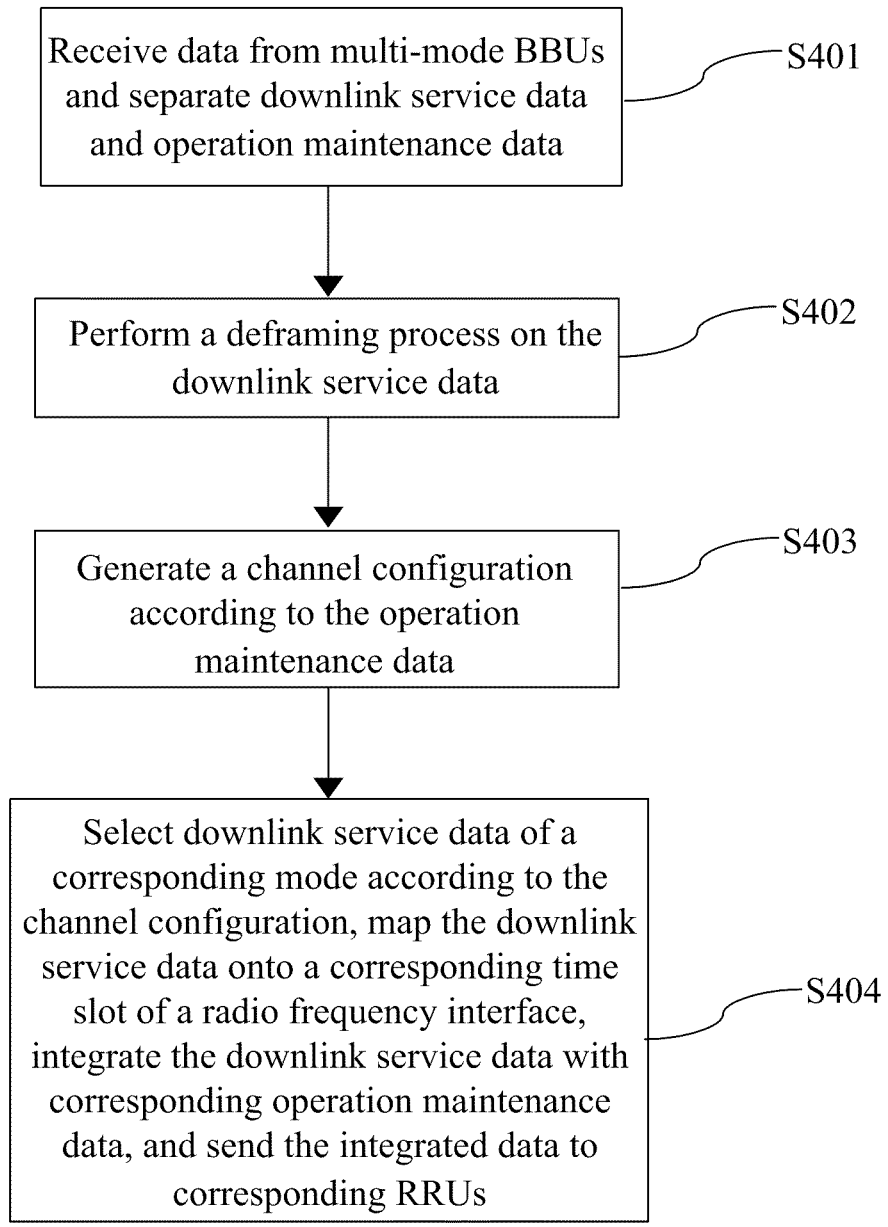
FIG. 4 is a flow chart of a multi-mode combination method according to a second embodiment of the present invention.

As shown in FIG. 4, a multi-mode convergence method provided in a second embodiment of the present invention includes the following steps.

In Step S401, data from BBUs of two or more modes is received and separated into downlink service data and operation maintenance data.

In the CPRI protocol, different time slots represent different contents, and the downlink service data and the operation maintenance data can be separated through time division multiplexing (TDM) de-multiplexing.

In Step S402, a deframing process is performed on the downlink service data according to the CPRI standard protocol, that is, the uplink service data is divided from the CPRI frame.

In Step S403, a channel configuration is generated according to the operation maintenance data and the operation maintenance data is broadcast.

As the configuration information of the operation maintenance data includes information such as a position of service data of each mode in the CPRI frame, according to the information, different pathways can be configured for service data of various modes, so as to transmit the service data of different modes to the RRUs.

In Step S404, downlink service data of a corresponding mode is selected according to the channel configuration, the downlink service data is mapped onto a time slot of the CPRI interface, the downlink service data and the operation maintenance data are consolidated, and the consolidated data is sent to the corresponding RRUs.

Specifically, after the service data of the corresponding mode is selected according to the channel configuration, the downlink service data is mapped onto a time slot of the CPRI interface according to the CPRI protocol. The downlink service data mapped onto the time slot of the CPRI interface and the corresponding operation maintenance data are consolidated and sent to the RRU. The downlink service data and the operation maintenance data are usually consolidated combined by using a TDM manner specified in the CPRI protocol, which is omitted in the embodiments of the present invention.

It should be noted that persons skilled in the art can understand that Steps 403 and 402 are not subject to a strict time sequence, it is only for ease of description in this embodiment, and the sequence is not limited in this embodiment.

Through the multi-mode convergence method in this embodiment, when various systems coexist, the various systems can be uncoupled, so that the various systems are independent from each other, complexity of each system is decreased, and cost is decreased.

Figure 5:
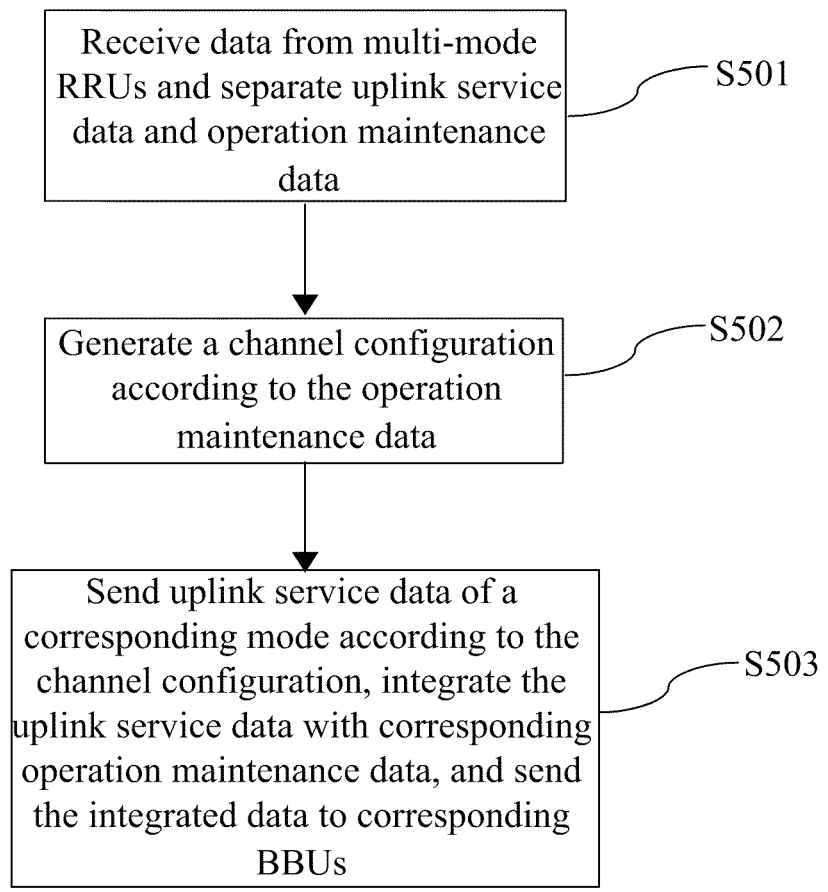
FIG. 5 is a flow chart of a multi-mode combination method according to a third embodiment of the present invention.

In an embodiment, the present invention further provides a multi-mode combination method. As shown in FIG. 5, a multi-mode combination method provided in a third embodiment of the present invention includes the following steps.

In Step S501, data from RRUs of two or more modes is received, and separated into uplink service data and operation maintenance data.

In Step S502, a channel configuration is generated according to the operation maintenance data.

In Step S503, uplink service data of a mode is sent according to the channel configuration of the mode, the uplink service data and the operation maintenance data of the mode are consolidated, and the consolidated data is sent to BBUs of the mode.

The multi-mode combination method provided in this embodiment is configured to accomplish the multi-mode function, so as to decrease complexity of a multi-mode system, uncouple various systems when a plurality of systems coexists, so that the various systems are independent from each other, complexity of each system is decreased, and cost is decreased.

In the following a base station that conforms to the CPRI standard is taken as an example, specific implementation of the present invention is illustrated. However, persons skilled in the art can understand that other open interface standards such as the OBSAI standard and the CPRI standard are also applicable in the embodiments of the present invention.

Figure 6:
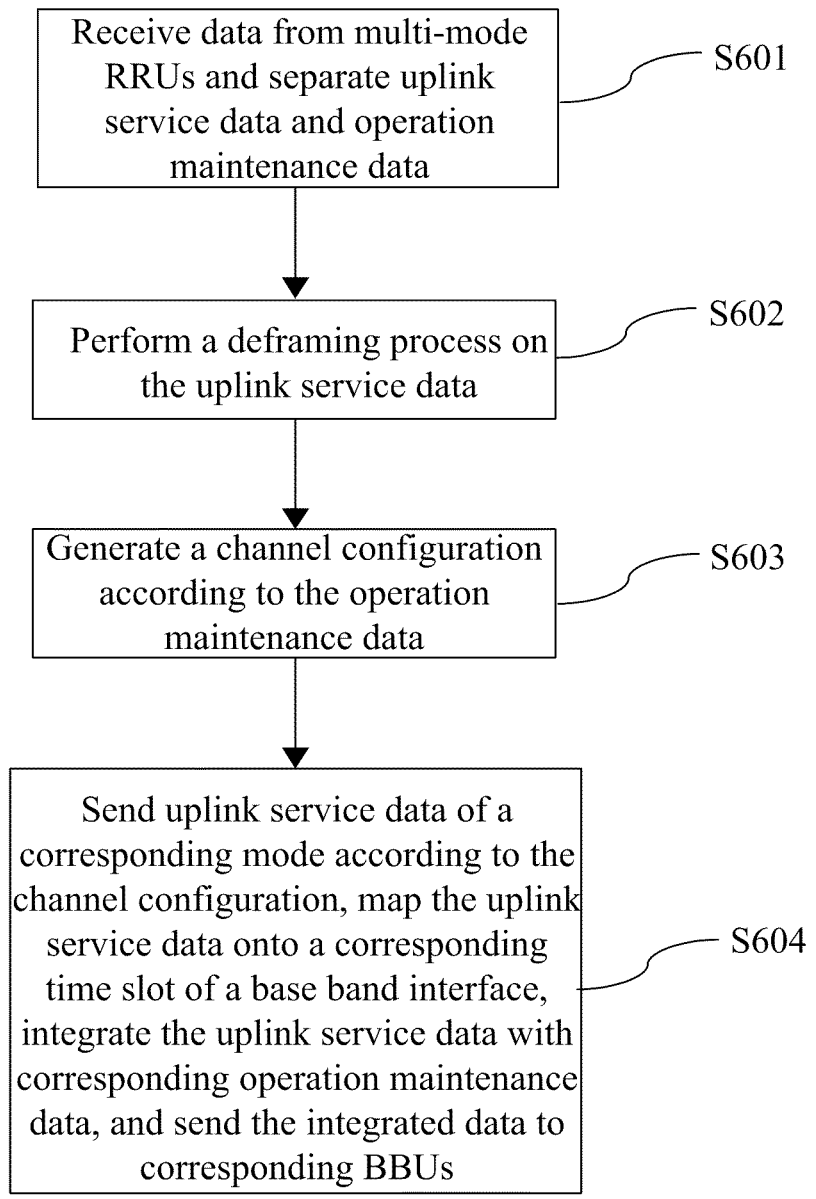
FIG. 6 is a flow chart of a multi-mode combination method according to a fourth embodiment of the present invention.

As shown in FIG. 6, a multi-mode combination method provided in a fourth embodiment of the present invention includes the following steps.

In Step S601, data from RRUs of two or more modes is received and separated into uplink service data and operation maintenance data.

In the CPRI protocol, different time slots represent different contents and the downlink service data and operation maintenance data can be separated through TDM de-multiplexing.

In Step S602, a deframing process is performed on the uplink service data according to CPRI standard protocol, that is, the uplink service data is divided from the CPRI frame.

In Step S603, channel configuration is generated according to the operation maintenance data, and the operation maintenance data is broadcast.

As the configuration information of the operation maintenance data includes information such as a position of service data of each mode in the CPRI frame, different pathways can be configured for service data of various modes according to the information.

In Step S604, uplink service data of a corresponding mode is sent according to the channel configuration, the uplink service data is mapped onto a time slot of the CPRI interface, the uplink service data and the operation maintenance data are consolidated, and the consolidated data is sent to a corresponding BBU.

Specifically, after the service data of the corresponding mode is selected according to the channel configuration, the uplink service data is mapped onto the time slot of the CPRI interface according to the CPRI protocol, the uplink service data that is mapped onto the time slot of the CPRI interface and corresponding operation maintenance data are consolidated, and sent the consolidated data to the RRU. The uplink service data and operation maintenance data are usually consolidated by adopting a TDM manner specified in the CPRI protocol, which is omitted in the embodiment of the present invention.

It should be noted that persons skilled in the art can understand that Steps 602 and 603 are not subject to a strict sequence, it is only for ease of description in this embodiment, and the sequence is not limited in this embodiment.

The multi-mode combination method provided in this embodiment is configured to accomplish a multi-mode function, so as to decrease complexity of a multi-mode system, uncouple various systems when a plurality of systems coexists, so that various systems are independent from each other, complexity of each system is decreased, and cost is reduced.

Figure 7:
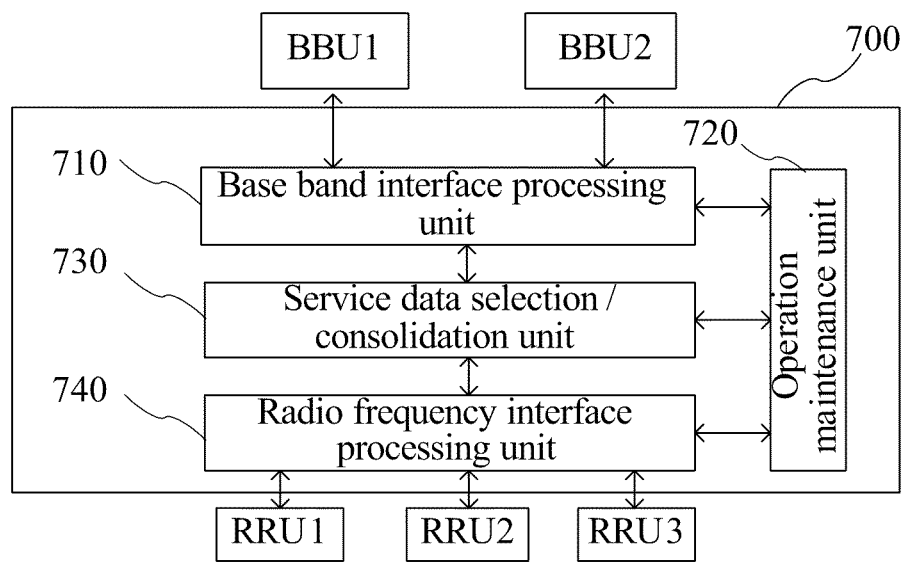
FIG. 7 is a structural view of a multi-mode convergence/combination device according to a fifth embodiment of the present invention.

As shown in FIG. 7, a multi-mode convergence/combination device 700 provided in a fifth embodiment of the present invention includes a base band interface processing unit 710, an operation maintenance unit 720, a service data selection/consolidation unit 730, and a radio frequency interface processing unit 740.

In a Downlink Direction:

The base band interface processing unit 710 is configured to receive data from BBUs of two or more modes and separate the received data into downlink service data and operation maintenance data.

The operation maintenance unit 720 is configured to generate a channel configuration according to the operation maintenance data.

The service data selection/consolidation unit 730 is configured to select downlink service data of a mode according to the channel configuration of the mode.

The radio frequency interface processing unit 740 is configured to consolidate the selected downlink service data and the operation maintenance data of the mode, and send the consolidated data to RRUs of the mode.

In an Uplink Direction:

The radio frequency interface processing unit 740 is configured to receive data from RRUs of two or more modes and separate the received data into uplink service data and operation maintenance data.

The operation maintenance unit 720 is configured to generate a channel configuration according to the operation maintenance data.

The service data selection/consolidation unit 730 is configured to send uplink service data of a mode according to the channel configuration of the mode.

The base band interface processing unit 710 is configured to consolidate the uplink service data sent by the service data selection/consolidation unit 730 and the operation maintenance data of the mode and send the consolidated data to BBUs of the mode.

The multi-mode convergence/consolidation device 700 provided in this embodiment can have functions in the uplink direction and functions in the downlink direction at the same time, or can also only have the functions in the uplink direction or the downlink direction, which is not limited in the embodiment of the present invention.

The multi-mode convergence/combination device provided in this embodiment is configured to accomplish a multi-mode function, so as to decrease complexity of a multi-mode system, uncouple various systems when a plurality of systems coexists, so that the various systems are independent from each other, complexity of each system is decreased, and cost is reduced.

Figure 8:
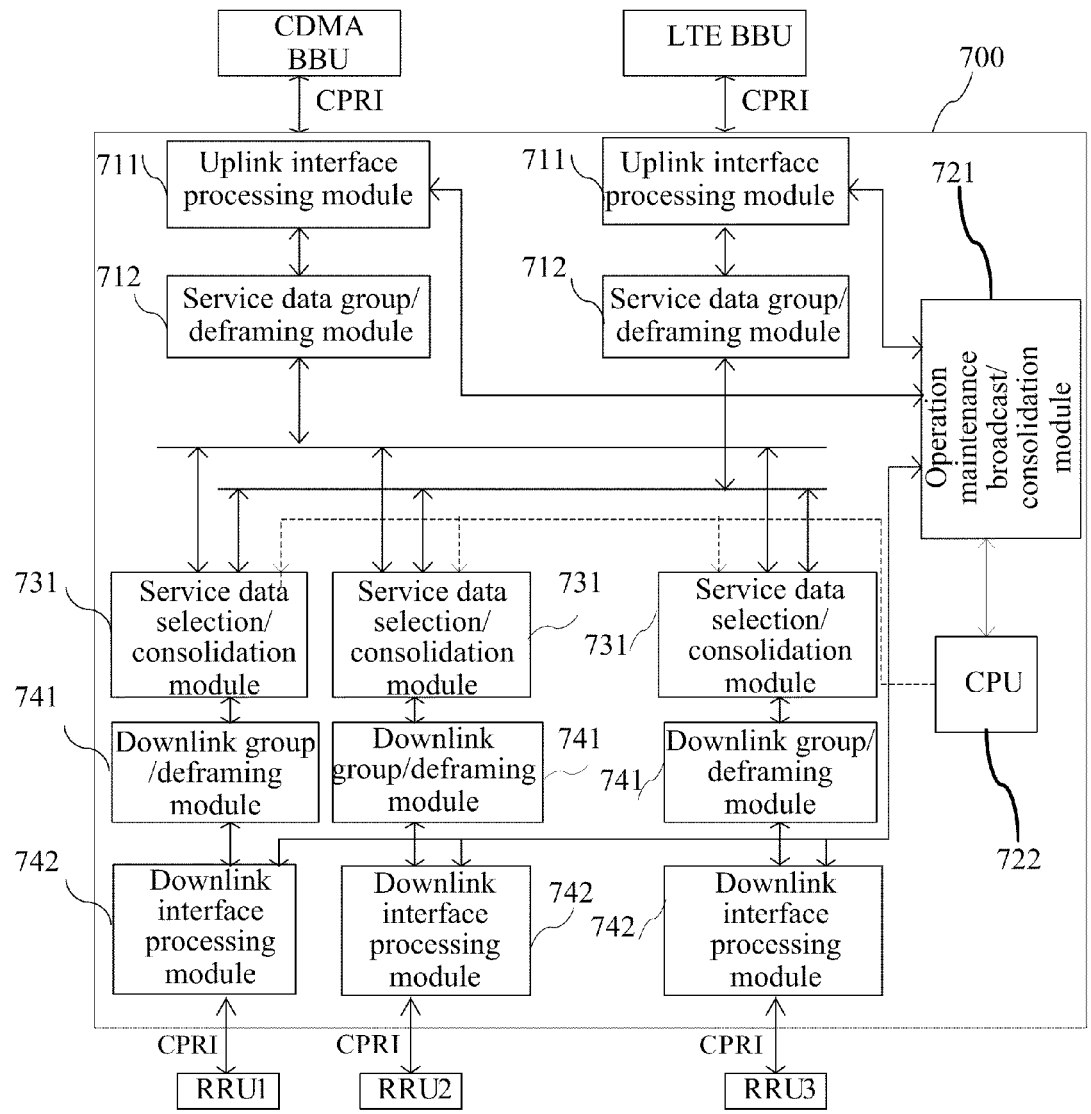
FIG. 8 is a structural view of a multi-mode convergence/combination device according to a sixth embodiment of the present invention.

FIG. 8 is a schematic view of a multi-mode convergence/combination device according to a sixth embodiment of the present invention. In this embodiment, a base station that conforms to the CPRI standard is taken as an example for illustration. However, persons skilled in the art can understand that other open interface standards such as the OBSAI standard and the CPRI standard are also applicable in the embodiments of the present invention.

Specifically, in a downlink direction:

The base band interface processing unit 710 may include a plurality of uplink interface processing modules 711 and service data group/deframing modules 712. The plurality of uplink interface processing module 711 is configured to receive base band service data and operation maintenance data from different modes and separate the received data into the downlink service data and the operation maintenance data. In the CPRI protocol, different time slots represent different contents. The uplink service data and the operation maintenance data are separated through TDM de-multiplexing. The plurality of service data group/deframing modules 712 is configured to receive the downlink service data sent by the corresponding uplink interface processing modules 711 and perform a deframing process.

The operation maintenance unit 720 may include an operation maintenance broadcast/consolidation module 721 and a central processing unit (CPU) 722. The operation maintenance broadcast/consolidation module 721 is configured to receive the operation maintenance data and send the operation maintenance data to the CPU 722 and receive and broadcast the operation maintenance data sent by the CPU 722. The CPU 722 receives the operation maintenance data sent by the operation maintenance broadcast/consolidation module 721, generate a channel configuration according to configuration information in the operation maintenance data, and send the operation maintenance data to the operation maintenance broadcast/consolidation module 721.

The service data selection/consolidation unit 730 may include a plurality of service data selection/consolidation modules 731. Each service data selection/consolidation module 731 receives corresponding downlink service data according to the channel configuration and sends the downlink service data to a next level.

The radio frequency interface processing unit 740 may include a plurality of downlink group/deframing modules 741 and downlink interface processing modules 742. The plurality of downlink group/deframing modules 741 is configured to receive the downlink service data sent by the corresponding service data selection/consolidation modules 731 and perform a framing process on the downlink service data, that is, map the downlink service data onto a time slot of the CPRI interface, and send the data to a next level. The plurality of downlink interface processing modules 742 is configured to receive the downlink service data sent by the corresponding downlink group/deframing modules 741, receive corresponding operation maintenance data broadcast by the operation maintenance broadcast/consolidation modules 721, consolidate the downlink service data and operation maintenance data, and send the consolidated data to a corresponding RRU.

In an uplink direction:

The radio frequency interface processing unit 740 may include a plurality of downlink group/deframing modules 741 and downlink interface processing modules 742. The plurality of downlink interface processing modules 742 is configured to receive and separate the received data into the uplink service data and the operation maintenance data of the corresponding RRUs. The plurality of downlink group/deframing modules 741 is configured to perform a deframing process on the uplink service data sent by the corresponding downlink interface processing modules 742.

The operation maintenance unit 720 may include an operation maintenance broadcast/consolidation module 721 and a CPU 722. The operation maintenance broadcast/consolidation module 721 is configured to receive the operation maintenance data, send the operation maintenance data to the CPU 722, and receive and broadcast the operation maintenance data sent by the CPU 722. The CPU 722 receives the operation maintenance data sent by the operation maintenance broadcast/consolidation module 721, generates a channel configuration according to the configuration information in the operation maintenance data, and send the operation maintenance data to the operation maintenance broadcast/consolidation module 721.

The service data selection/consolidation unit 730 may include a plurality of service data selection/consolidation modules 731. Each of the plurality of service data selection/consolidation modules 731 sends uplink service data according to the channel configuration.

The base band interface processing unit 710 may include a plurality of uplink interface processing modules 711 and service data group/deframing modules 712. The service data group/deframing modules 712 are configured to receive the number of uplink services sent by the corresponding service data selection/consolidation modules 731, perform a framing process on the uplink service data, and send the data to a next level. The uplink interface processing modules 711 are configured to receive the uplink service data sent by the service data group/deframing modules 712 and the corresponding operation maintenance data broadcast by the operation maintenance broadcast/consolidation module 721, consolidate the uplink service data and the operation maintenance data, and send the consolidated data to corresponding BBUs.

As shown in FIG. 8, the RRU1 to RRU3 support different modes respectively. The different RRUs, downlink interface processing modules 742, downlink group/deframing modules 741, and service data selection/consolidation modules 731 that are connected together form data channels of different modes, and service data of various modes are sent to BBUs supporting the modes through the channel configuration.

The multi-mode convergence/combination device 700 provided in this embodiment can have functions in the uplink direction and functions in the downlink direction at the same time, or also can only have the functions in the uplink direction or the downlink direction, which is not limited in the embodiment of the present invention.

Persons skilled in the art can understand that the modules of the same type are described as multiple only for ease of understanding. In practical implementation, the multiple modules can be consolidated in the same physical entity or can also be placed respectively, which is not limited in the embodiments of the present invention.

The multi-mode convergence/combination device provided in this embodiment is configured to accomplish a multi-mode function, so as to decrease complexity of a multi-mode system and uncouple various systems when a plurality of systems coexists, so that the various systems are independent from each other, complexity of each system is decreased, and cost is reduced.

The multi-mode convergence/combination device provided in this embodiment can further accomplish service data preprocess functions such as pseudo noise (PN) multiplexing and statistics and calculation of transmission power. The PN multiplexing function means that a plurality of carriers shares the same pilot sequence. The statistics of the transmission power means statistics of the transmission power of all RRUs through operation maintenance links. The calculation of reception power means a consolidation of reception power of all the RRUs of the same PN in a shared PN manner and a unit conversion.

Figure 9:
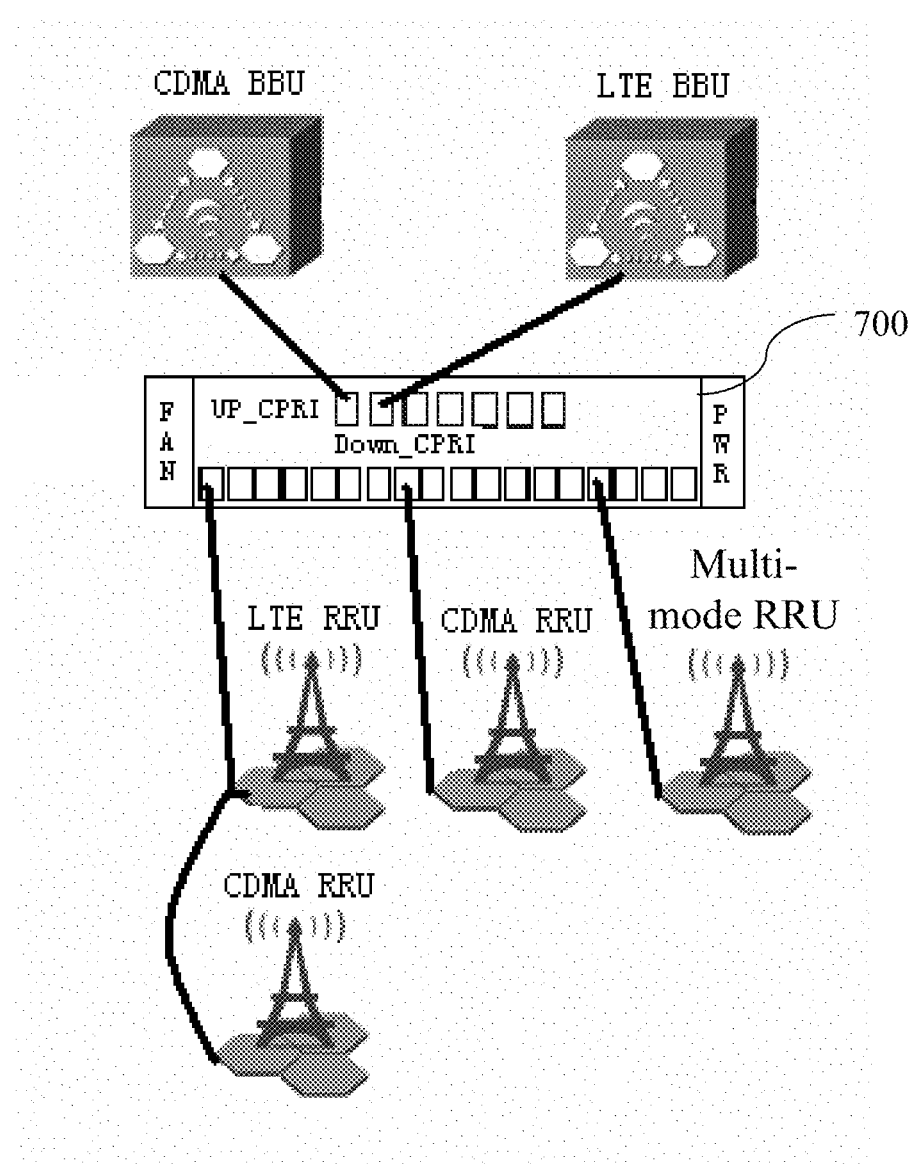
FIG. 9 is a schematic view of a system including a multi-mode convergence/combination device according to a seventh embodiment of the present invention.

FIG. 9 is a schematic view of a system including a multi-mode convergence/combination device according to a seventh embodiment of the present invention. The system provided in the embodiment of the present invention adds a multi-mode convergence/combination device 700 between a BBU and an RRU, and the multi-mode convergence combination device 700 accomplishes functions such as multi-mode convergence and combination. The multi-mode convergence combination device 700 provides a base band data pathway to the BBU or other units, so as to receive downlink base band data and send uplink base band data, provides a data pathway to a local or remote radio frequency module, so as to accomplish functions of sending the downlink data and receiving the uplink data, and provides an operation maintenance pathway to a local or remote radio frequency module, so as to accomplish or partially accomplish management of the radio frequency module.

In the system provided in the embodiment of the present invention, by introducing the multi-mode convergence/combination device 700, complexity of the multi-mode system is decreased, various systems are uncoupled when a plurality of systems coexists, various systems are independent from each other, and at the same time, cost is also reduced.

The service data and operation maintenance data of different systems are transmitted to RRUs of multiple modes on the same CPRI link in a TDM manner, which saves optical fiber or cable resource compared with the situation when the data of different modes are transmitted to RRUs from BBUs on independent transmission links.

Persons skilled in the art can understand that the multi-mode or various systems in all the embodiments can be a combination of any two or more among various systems, such as a global system for mobile communications (GSM) system, a code division multiple access (CDMA) system, a worldwide interoperability for microwave access (WiMAX) system, a wideband CDMA (WCDMA) system, a CDMA2000 system, and a long term evolution (LTE) system, which is not limited in the embodiment of the present invention here.

Detailed above are the objectives, technical solution and merits of the present invention. It is understandable that the descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A multi-mode combination method, comprising:
   receiving data from remote radio units (RRUs) of two or more modes;
   separating the received data into uplink service data and operation maintenance data, wherein the multi-mode means two or more modes;
   generating channel configuration according to the operation maintenance data;
   consolidating the uplink service data of a mode and the operation maintenance data of the mode; and
   sending the consolidated data to a base band unit (BBU) of the mode according to the channel configuration of the mode.

2. The multi-mode combination method according to claim 1, after the separating the received data into the uplink service data and the operation maintenance data, further comprising performing a deframing process on the uplink service data.

3. The multi-mode combination method according to claim 1, after the generating channel configuration according to the operation maintenance data, further comprising broadcasting the operation maintenance data in uplink direction.

4. The multi-mode combination method according to claim 1, before the consolidating the uplink service data of a mode and the operation maintenance data of the mode, further comprising mapping the uplink service data onto a time slot of base band interfaces.

5. The multi-mode combination method according to claim 1, wherein the separating the received data into the uplink service data and the operation maintenance data comprises separating the received data into the uplink service data and the operation maintenance data through time division multiplexing (TDM) de-multiplexing.

6. A multi-mode combination device, comprising:
   a radio frequency interface processing unit, configured to receive data from remote radio units (RRUs) of two or more modes, and separate the received data into uplink service data and operation maintenance data, wherein the multi-mode means two or more modes;
   an operation maintenance unit, configured to generate channel configuration according to the operation maintenance data;
   a service data selection/consolidation unit, configured to send uplink service data of a mode according to the channel configuration of the mode; and
   a base band interface processing unit, configured to consolidate the uplink service data sent by the service data selection/consolidation unit and the operation maintenance data of the mode, and send the consolidated data to base band unit (BBU) of the mode.

7. The multi-mode combination device according to claim 6, wherein
the radio frequency interface processing unit comprises:
a plurality of downlink interface processing modules, configured to receive data from remote radio units (RRUs) of two or more modes, and separate the received data into the uplink service data and the operation maintenance data of the corresponding RRUs; and
a plurality of downlink group/deframing modules, configured to perform a deframing process on the uplink service data sent by the corresponding downlink interface processing modules;
the operation maintenance unit comprises:
an operation maintenance broadcast/consolidation module, configured to receive the operation maintenance data, send the operation maintenance data to a central processing unit (CPU), and receive and broadcast the operation maintenance data sent by the CPU; and
a CPU, configured to receive the operation maintenance data sent by the operation maintenance broadcast/consolidation module, generate the channel configuration according to configuration information in the operation maintenance data, and send the operation maintenance data to the operation maintenance broadcast/consolidation module;
the service data selection/consolidation unit comprises:
a plurality of service data selection/consolidation module, each configured to send the uplink service data according to the channel configuration; and
the base band interface processing unit comprises:
a service data group/deframing module, configured to receive a number of uplink services sent by the service data selection/consolidation modules of the mode, perform a framing process on the uplink service data, and send the processed data to a next level; and
an uplink interface processing module, configured to receive the uplink service data sent by the service data group/deframing module and the operation maintenance data of the mode broadcast by the operation maintenance broadcast/consolidation module, consolidate the uplink service data and the operation maintenance data, and send the consolidated data to the BBU of the mode.

8. A multi-mode convergence system, comprising:
two or more remote radio units (RRUs);
two or more base band units (BBUs); and
a multi-mode combination device, wherein the multi-mode combination device comprises:
a radio frequency interface processing unit, configured to receive data from remote radio units (RRUs) of two or more modes, and separate the received data into uplink service data and operation maintenance data, wherein the multi-mode means two or more modes;
an operation maintenance unit, configured to generate channel configuration according to the operation maintenance data;
a service data selection/consolidation unit, configured to send uplink service data of a mode according to the channel configuration of the mode; and
a base band interface processing unit, configured to consolidate the uplink service data sent by the service data selection/consolidation unit and the operation maintenance data of the mode, and send the consolidated data to base band unit (BBU) of the mode.

* * * * *